United States Patent
Ide et al.

[11] Patent Number: 5,933,549
[45] Date of Patent: Aug. 3, 1999

[54] METHOD AND APPARATUS FOR IMAGE EDITING USING KEY FRAME IMAGE CONTROL DATA

[75] Inventors: Reiko Ide, Osakashi; Hiroshi Ota, Narashi, both of Japan

[73] Assignee: Matsushita Electric Industrial Co., Ltd., Japan

[21] Appl. No.: 08/866,248

[22] Filed: Jun. 5, 1997

[30] Foreign Application Priority Data

Jun. 7, 1996 [JP] Japan .................................. 8-146134

[51] Int. Cl.⁶ ...................................................... G06K 9/03
[52] U.S. Cl. .......................... 382/309; 382/232; 382/236; 382/248; 382/300; 345/473; 345/474; 345/475
[58] Field of Search .................................. 345/473–475, 345/328, 951; 382/298–299, 300, 256, 232, 242–243, 236, 293, 169, 309, 248; 348/403–407, 650, 587, 577, 590

[56] References Cited

U.S. PATENT DOCUMENTS

| | | | |
|---|---|---|---|
| 4,797,836 | 1/1989 | Witek et al. ............................. | 345/473 |
| 5,594,853 | 1/1997 | Salesin et al. ........................... | 345/441 |
| 5,598,182 | 1/1997 | Berend et al. ........................... | 345/133 |
| 5,619,628 | 4/1997 | Fujita et al. ............................. | 345/427 |
| 5,692,117 | 11/1997 | Berend et al. ........................... | 345/475 |
| 5,754,183 | 5/1998 | Berend et al. ........................... | 345/429 |

*Primary Examiner*—Leo H. Boudreau
*Assistant Examiner*—Ishrat Sherali
*Attorney, Agent, or Firm*—Parkhurst & Wendel

[57] ABSTRACT

An image editing apparatus having an input for key frame information and a key frame storage means. A first interpolation control point calculates means for receiving information from key frame storage and calculates control points for curve interpolation. A key frame shape decision means receives the information from the storage means, decides the shape of a key frame, and outputs the information. A second interpolation control point calculates control points by a different method than the first interpolation. Curve interpolation means receive output from both interpolation means and replaces the first interpolation with the second, and performs the curve interpolation using the second replacement control points. Storage means receive the timing information and output an image to a display unit. Thus, the notion of the image is accelerated at the starting key frame and breaks the motion at an and key frame without adding manual key frames.

4 Claims, 9 Drawing Sheets

METHOD AND APPARATUS FOR IMAGE EDITING USING KEY FRAME IMAGE CONTROL DATA

FIELD OF THE INVENTION

The present invention relates to an image editing apparatus and an image editing method used for learning setting of an image (to set while learning), wherein continuous image control data is produced from key frame information which is composed of position, size and other data of an image on a screen at a particular time by performing curve interpolation of the position or size data at constant time intervals between key frames, and an image is reproduced on the basis of the image control data.

BACKGROUND OF THE INVENTION

In recent years, image editing apparatus have been required to realize a variety of advanced image effects in simple processing. For example, in learning setting of an image, continuous image control is performed by curve interpolation between key frames using key frame data. As means to set image effects, developed is an apparatus capable of controlling an image with image control data which is obtained by curve interpolation of key frame data comprising time, position, size, zoom ratio and the like, using, for example, Bézier curve, for reproduction and display of the image.

Hereinafter, an example of a prior art image editing apparatus will be described with reference to FIG. 8. FIG. 8 is a block diagram illustrating an image editing apparatus disclosed in Japanese Published Patent Application No. Hei. 4-251027.

In FIG. 8, reference numeral 401 designates a key frame information input means for inputting key frame information comprising time on an image sequence, and other information. A key frame information storage unit 403 stores key frame information 402 output from the key frame information input means 401. An interpolation control point calculating unit 405 receives key frame information 404 output from the key frame information storage unit 403 and calculates interpolation control points 406. A timing generation means 408 generates timing control data 409 and 410 for reproducing an image at constant time intervals. A curve interpolation unit 407 receives the interpolation control points 406 output from the interpolation control point calculating unit 405 and the timing control data 409 output from the timing generation means 408, and periodically outputs image control data 412, such as coordinate data, to an image reproduction means 414. A storage unit 411 receives the timing control data 410 and periodically outputs image data 413 to the image reproduction means 414. The image reproduction means 414 controls reproduction of the image data using the image control data 412, and outputs the image data to a display unit 416.

A description is given of the operation of the image editing apparatus so constructed.

Initially, the key frame information input means 401 stores the key frame information 402 in the key frame information storage unit 403. The key frame information 404 is taken out of the key frame information storage unit 403 and input to the interpolation control point calculating unit 405 wherein control points for curve interpolation are calculated. Then, the curve interpolation unit 407 performs curve interpolation between key frames using the interpolation control points, providing image control data 412.

Next, the image reproduction means 414 displays an image on the display unit 416, using the image control data 412 and the image data 413 that is output from the storage unit 411 at a constant rate (for example, 30 frames/sec).

Using the image editing apparatus mentioned above, when a Bézier curve is generated, a Bézier curve passing an input point coordinate is obtained, whereby the shape and position of a curve to be drawn are grasped before they are input. As a result, drawing with a Bézier curve is realized using a favorable user interface.

In the prior art image editing apparatus, however, since all the key frames are subjected to identical curve interpolation, precise interpolation is not performed as shown in FIG. 9(a). That is, when four key frames, K0, K1, K2, K3, are input, the image protrudes from the display at the image display position P(tn) at time tn as shown in FIG. 9(b), i.e., so-called 'overshoot' occurs. Further, in a key frame at which the motion of image suddenly changes (end point or mountain/valley point), key points must be added manually because the displayed image does not fit visual characteristics of human beings. Therefore, it is difficult to obtain a high grade image control effect easily.

SUMMARY OF THE INVENTION

It is an object of the present invention to provide an image editing apparatus that can produce an image effect such that the motion of image changes and decelerates in the vicinity of a key frame, in a simple process without manual operation for adding key frames, and that can output, as a result of the image effect, a beautiful image that fits visual characteristics of human beings.

It is another object of the present invention to provide an image editing method that can provide the above-mentioned effects.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an image editing apparatus comprises: key frame information input means for inputting key frame information comprising time on an image sequence and other information; key frame information storage means for storing the key frame information; first interpolation control point calculating means for receiving the key frame information output from the key frame information storage means, and calculating first interpolation control points used for curve interpolation, by a first calculation method; key frame shape decision means for receiving the key frame information output from the key frame information storage means, deciding the shape of a key frame, and outputting key frame shape information; second interpolation control point calculating means for receiving the key frame information output from the key frame information storage means and the key frame shape information output from the key frame shape decision means, and calculating second interpolation control points by a second calculation method different from the first calculation method when the key frame shape is 'end point' or 'mountain/valley point'; timing generating means for generating timing information of image output; curve interpolation means for receiving the first interpolation control points output from the first interpolation control point calculating means, second interpolation control points output from the second interpolation control point calculating means, and the timing information output from the timing generating means, performing curve interpolation between key frames, and outputting image control information; storage means for receiving the timing information output from the timing generating means, and outputting an image at the input timing; and image reproducing means for receiving the image output from the storage means and the image control information output from the curve interpolation means, and outputting the image to a display unit.

According to a second aspect of the present invention, in the image editing apparatus, the second interpolation control point calculating means calculates second interpolation control points for curve interpolation between two key frames which are represented on a coordinate plane having the time on its abscissa and one of other key frame information on its ordinate, and tangent lines passing the respective key frames have prescribed gradients.

According to a third aspect of the present invention, there is provided an image editing method in which key frame information comprising time on an image sequence and other information is input, and an image is output after performing curve interpolation between key frames using image control information, and this method comprises the steps of: deciding the shape of a key frame from the input key frame information and, when the shape is 'end point' or 'mountain/valley point', calculating interpolation control points by a calculation method different from an ordinary calculation method; and producing the image control information by performing curve interpolation between key frames using interpolation control points calculated by the ordinary calculating method, the interpolation control points calculated by the calculating method different from the ordinary method, and image output timing information.

According to a fourth aspect of the present invention, in the image editing method, when the shape of the key frame is 'end point' or 'mountain/valley point', in order to perform curve interpolation between two key frames which are represented on a coordinate plane having the time on its abscissa and one of other key frame information on its ordinate, the interpolation control points are calculated using tangent lines passing the respective key frames and having prescribed gradients.

DETAILED DESCRIPTION OF THE PREFERRED EMBODIMENTS

Figure 1:
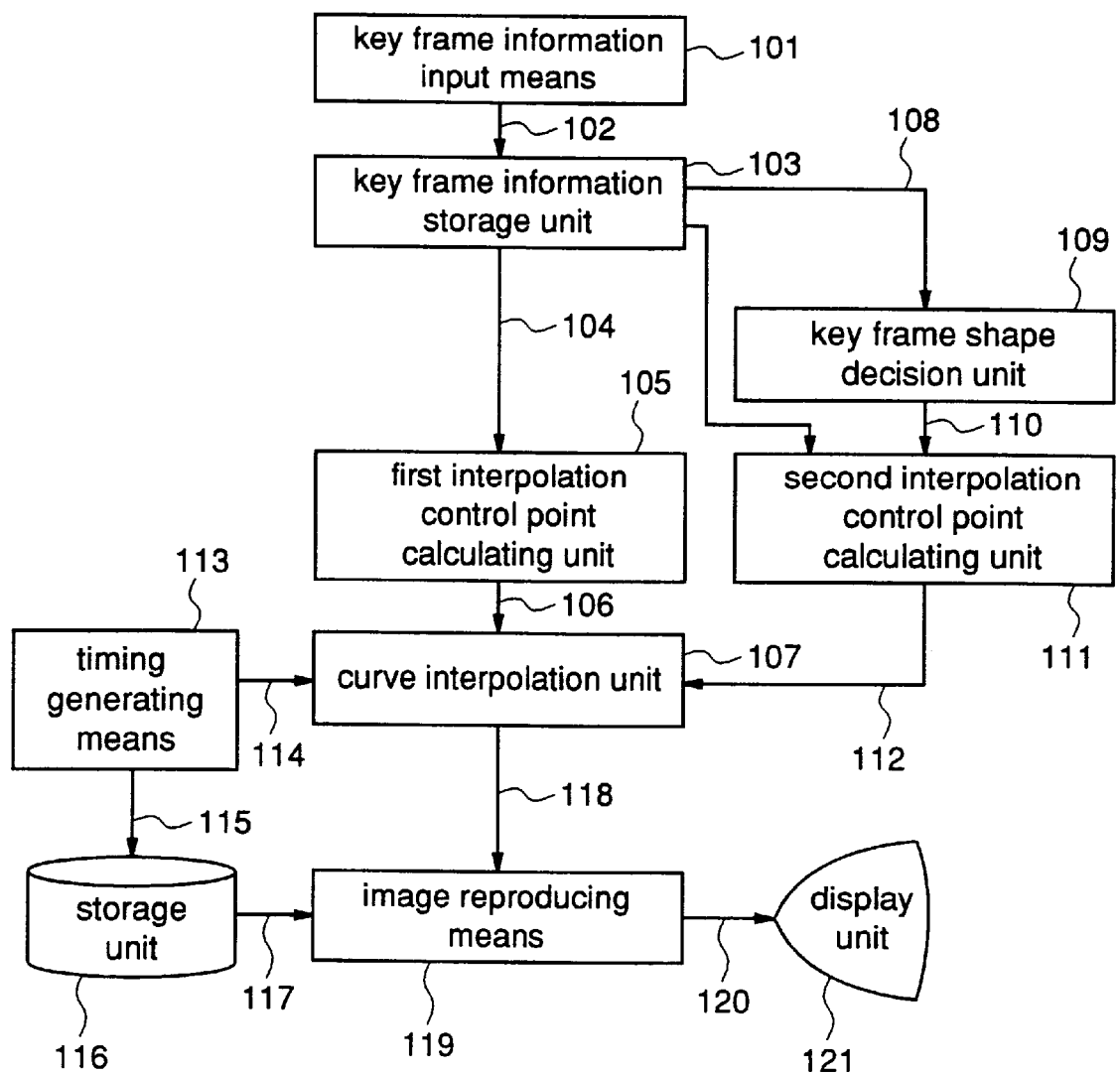
FIG. 1 is a block diagram illustrating an image editing apparatus according to an embodiment of the present invention.

FIG. 1 is a block diagram illustrating an image editing apparatus according to an embodiment of the invention. In FIG. 1, reference numeral 101 designates a key frame information input means. A key frame information storage unit 103 stores key frame information 102 output from the key frame information input means 101. A first interpolation control point calculating unit 105 receives key frame information 104 output from the key frame information storage unit 103 and calculates first interpolation control points 106. A key frame shape decision unit 109 receives key frame information 108 output from the key frame information storage unit 103, decides the shape of the key frame on the basis of the key frame information 108, and outputs key frame shape information 110. A second interpolation control point calculating unit 111 changes the control point calculating method according to the key frame information output from the key frame information storage unit 103 and the key frame shape information 110 output from the key frame shape decision unit 109, and calculates second interpolation control points 112.

A timing generating means 113 generates timing control data 114 and 115 for reproducing an image at constant time intervals. A curve interpolation unit 107 receives the first interpolation control points 106 output from the first interpolation control point calculating unit 105, the second interpolation control points 112 output from the second interpolation control point calculating unit 111, and the timing control data 114 output from the timing generating means 113. When the second interpolation control points 112 reside in the key frame, the curve interpolation unit 107 performs curve interpolation using the second interpolation control points 112 in place of the first interpolation control points 106, and periodically outputs image control data 118 that substantially controls the image, such as coordinate data, to an image reproducing means 119. A storage unit 116 receives the timing control data 115, and periodically outputs image data 117 to the image reproducing means 119. The image reproducing means 119 reproduces the image data 117 using the image control data 118, and outputs the reproduced image to a display unit 121.

The operation of the image editing apparatus so constructed will be explained using FIGS. 1, 2, and 3(a)–3(b).

First of all, the operation of the first interpolation control point calculating unit 105 will be described using FIG. 3(b). In FIG. 3(b), points K0-Kn (n=positive integer) represent input key frames on a coordinate plane having time data of the input key frames on its abscissa (t), and one of factors, such as coordinate data, on its ordinate (k(t)).

In order to obtain interpolation control points of input key frame data K1, initially, a segment K0.K2 connecting two key frames K0 and K2 before and after K1 is moved in parallel to obtain a segment K0'.K2' that passes K1. At this time, the segment K0'.K2' is decided so that a segment K0.K0' and a segment K2.K2' are respectively perpendicular to the segment K0.K2. This segment K0'.K2' is regarded as a control point direction segment for deciding the direction of interpolation control points before and after K1.

This processing is performed for input key frames K1 to Kn−1, i.e., input key frames excluding the first key frame K0 and the last key frame Kn, to obtain a direction Km−1'.Km+1' (m=integer, 0<m<n) of control points before and after a key frame Km.

In order to obtain interpolation control points S11 and S12 before and after K1 on the control point direction segment K0'.K2' of K1 which is obtained previously, a point dividing K1.K0' in 1:3 is given as the control point S11 before K1, and a point dividing K1.K2' in 1:3 is given as the control point S12 after K1.

This processing is performed for the control point direction segment Km−1'.Km+1' of the key frame Km, which is obtained previously, to obtain control points Sm1 and Sm2 before and after Km.

However, with respect to the first key frame K0 and the last key frame Kn, the control point after K0 is made equal to the control point S11 before K1, and the control point before Kn is made equal to the control point S(n−1)2 after Kn−1.

Next, the operation of the key frame shape decision unit 109 and the second interpolation control point calculating unit 111 will be described using FIG. 3(a) and flowcharts shown in FIGS. 4, 5, and 6(a)–6(c).

Figure 3A:
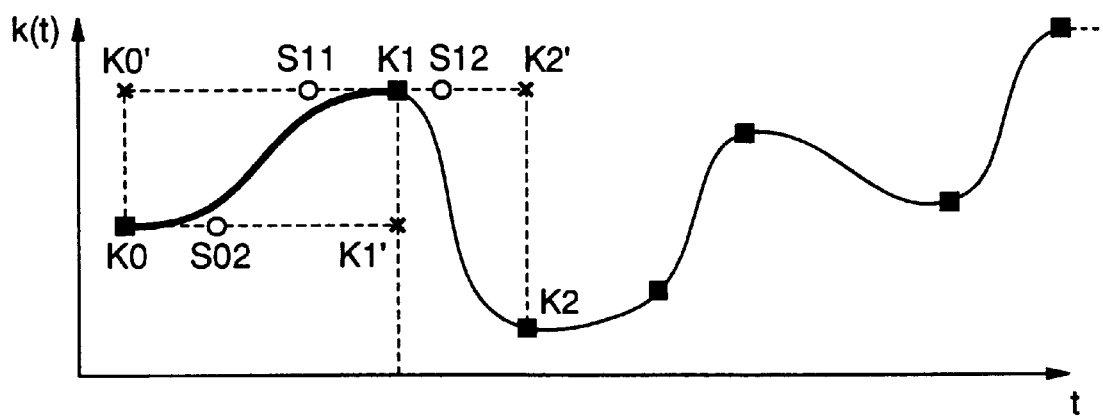
FIG. 3(a) is a diagram illustrating the relationship between second interpolation control points and interpolation curves for explaining the operation of the image editing apparatus.
Figure 3B:
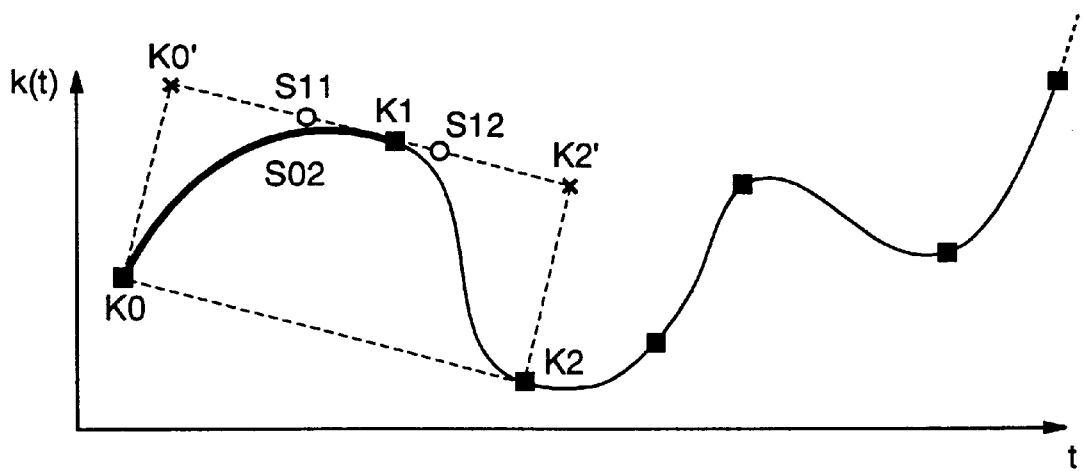
FIG. 3(b) is a diagram illustrating the relationship between interpolation control points and interpolation curves for explaining a curve interpolation method according to the invention in comparison with the prior art method.

In FIG. 3(a), (n+1) key frame data (coordinate data, size, and the like) obtained in the key frame information storage unit 103 are given by Km (tm, k(tm)) wherein m is an integer (0<m<n) and t is the unit of time, such as frame number.

Figure 4:
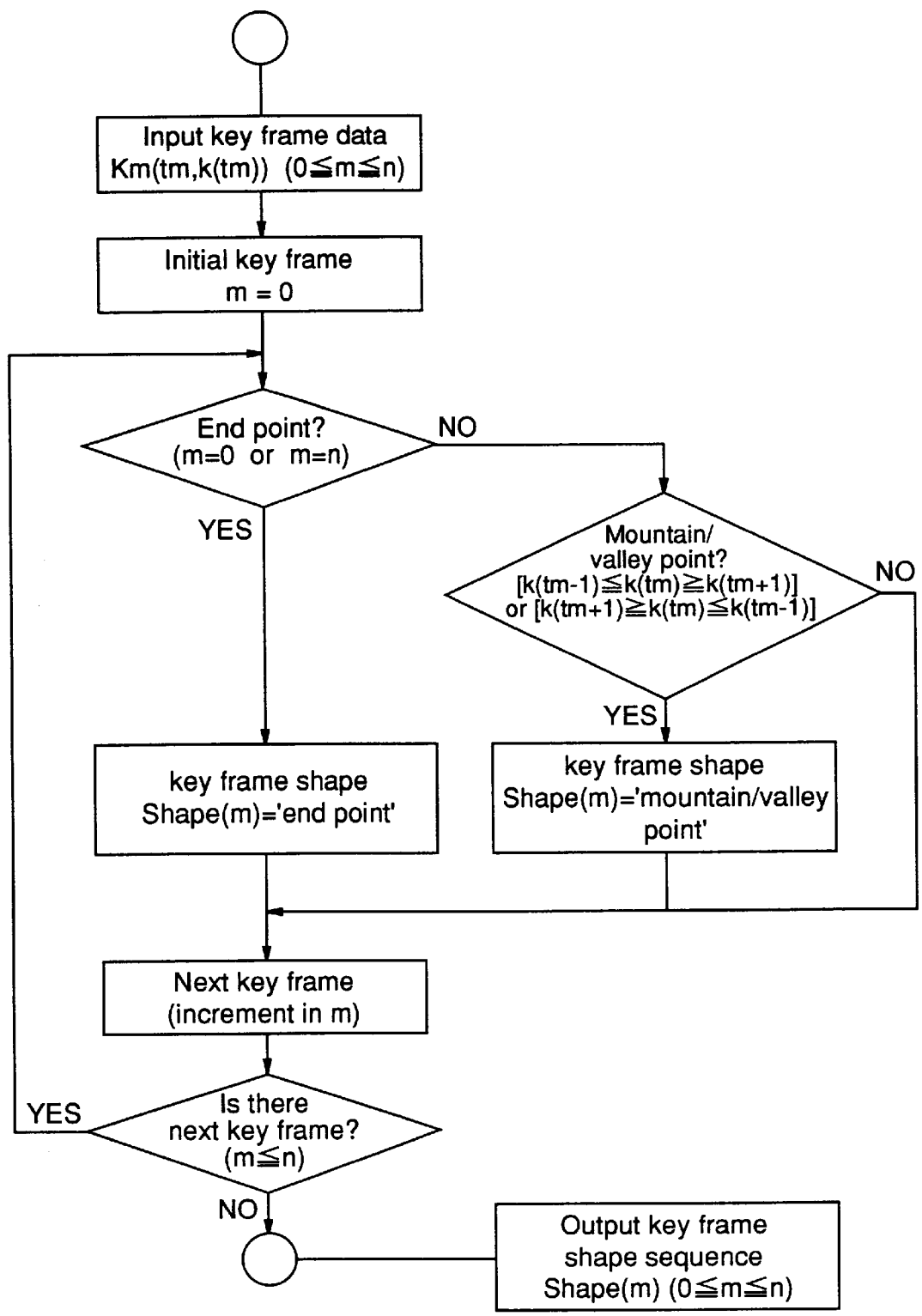
FIG. 4 is a flowchart for explaining the operation of a key frame shape decision unit included in the image editing apparatus.

The shape of Km is decided as follows according to steps in the flowchart shown in FIG. 4.

(1) When m=0 or m=n, the shape is decided as 'end point'.

(2) In case of 0<m<n, when k(tm−1)≦(tm)≧k(tm+1) or k(tm+1) ≧k(tm) ≦k(tm−1), the shape is decided as 'mountain/valley point'.

Figure 5:
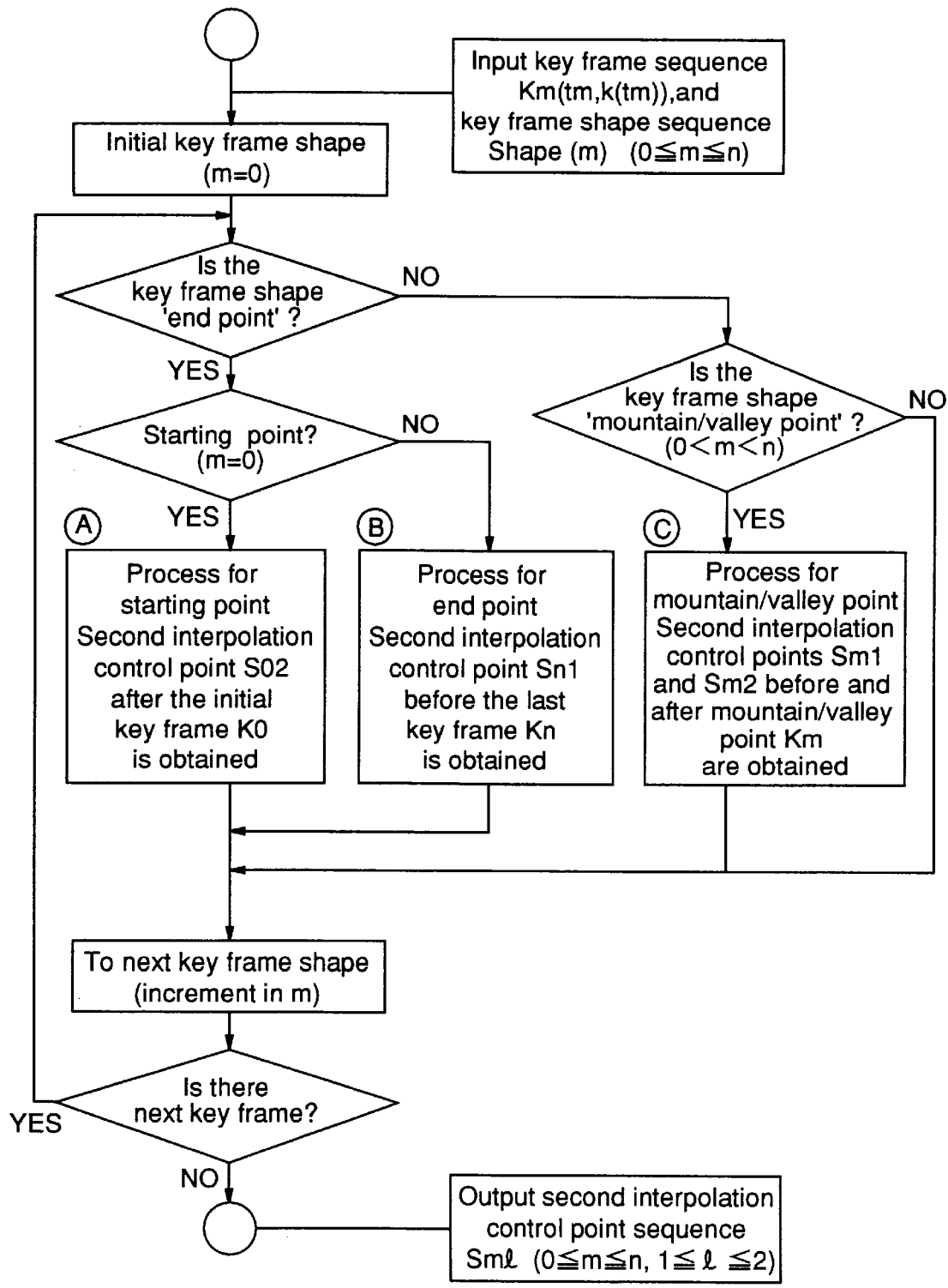
FIG. 5 is a flowchart for explaining the operation of a second interpolation control point calculating unit included in the image editing apparatus.

Next, in the second interpolation control point calculating unit 111, when the key frame data Km has the shape of above (1) or (2), calculation of interpolation control points is performed as follows according to steps in the flowchart shown in FIG. 5.

When the shape of Km is 'end point' (case (1)), m becomes 0 or (n−1), and second interpolation control points S02 and Sn1 are obtained as follows.

Figure 6:
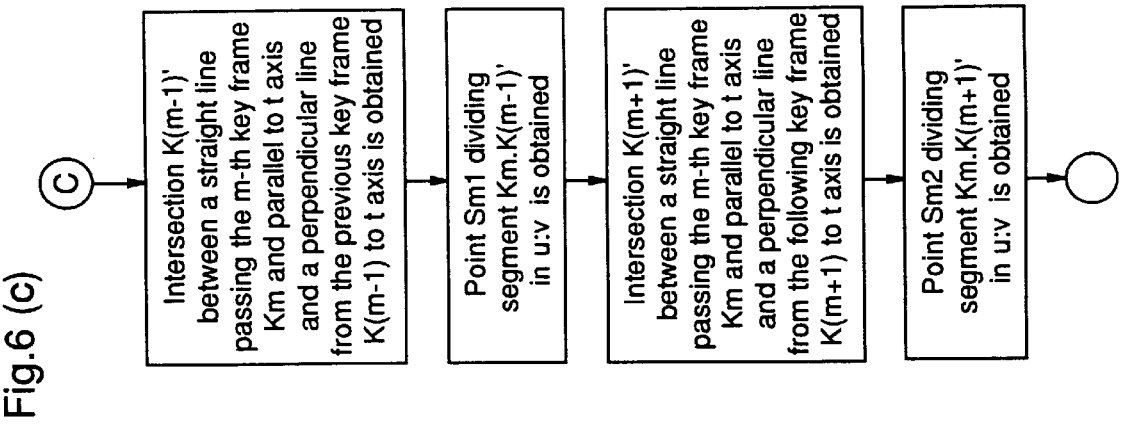
FIGS. 6(a)–6(c) are flowcharts for explaining the operation of the second interpolation control point calculating unit in more detail.
Figure 6:
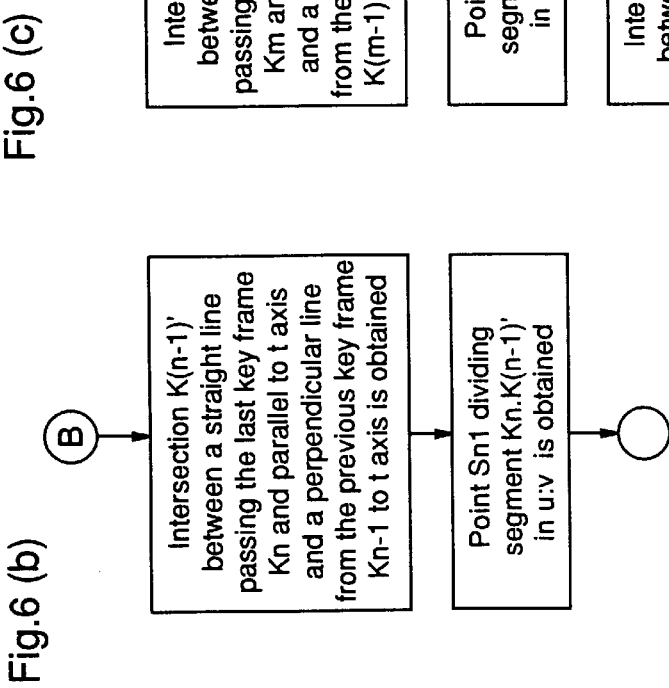
Figure 6:
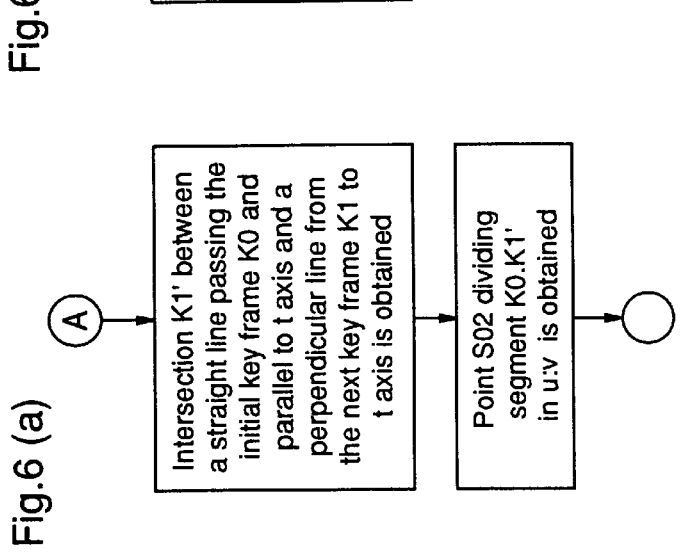

When m=0, a point of intersection between a straight line passing K0 and parallel to the t axis and a perpendicular line from K1 to the t axis is given by K1', and the second interpolation control point S02 after K0 is given by a point that divides K0.K1' in u:v (refer to FIG. 6(a)).

When m=n, a point of intersection between a straight line passing Kn and parallel to the t axis and a perpendicular line from Kn−1 to the t axis is given by K(n−1)', and the second interpolation control point Sn1 before Kn is given by a point that divides Kn.K(n−1)' in u:v (refer to FIG. 6(b)).

Further, when the shape of Km is 'mountain/valley point' (case (2)), second interpolation control points Sm2 and Sm1 are obtained as follows.

A point of intersection between a straight line passing Km and parallel to the t axis and a perpendicular line from K(m−1) to the t axis is given by K(m−1)', and the second interpolation control point Sm1 before Km is given by a point that divides Km.K(m−1)' in u:v (refer to FIG. 6(c)).

A point of intersection between a straight line passing Km and parallel to the t axis and a perpendicular line from K(m+1) to the t axis is given by K(m+1)', and the second interpolation control point Sm2 after Km is given by a point that divides Km.K(m+1)' in u:v.

Next, the operation of the curve interpolation unit 107 will be described using FIGS. 2 and 3(a)–3(b).

In the curve interpolation unit 107, among the first interpolation control points obtained in the first interpolation control point calculating unit 105, for those obtained in the second interpolation control point calculating unit 111 as well, these first interpolation control points are changed to the second interpolation control points, and curve interpolation between key frames is performed with spline curves, for example, Bézier curves, using the second interpolation control points.

That is, when a Bézier curve is generated between key frames Km and Km+1, it is generated using Km as a starting point, Km+1 as an end point, and Sm2 and S(m+1)1 as control points. At this time, because of geometrical characteristics of Bézier curves, the generated Bézier curve contacts the segment Km.Sm2 at Km and contacts the segment Km+1.S(m+1)1 at Km+1.

However, the Bézier curves before and after the key frame Km contact the segment Km.Sm1 and the segment Km.Sm2, respectively. Since both of these segments Km.Sm1 and Km.Sm2 are included in the segment Km−1'.Km+1', it is secured that the Bézier curves before and after the key frame Km contact the same segment, resulting in interpolation with smoothly connected Bézier curves.

FIG. 3(a) shows a curve generated by the above-mentioned method. For comparison, FIG. 3(b) shows a curve generated by the prior art method from the same input key frame as in FIG. 3(a). In these figures, the abscissa shows time data of input key frames, and the ordinate shows key frame position data (x,y coordinates), or size data and zoom ratio.

Figure 2:
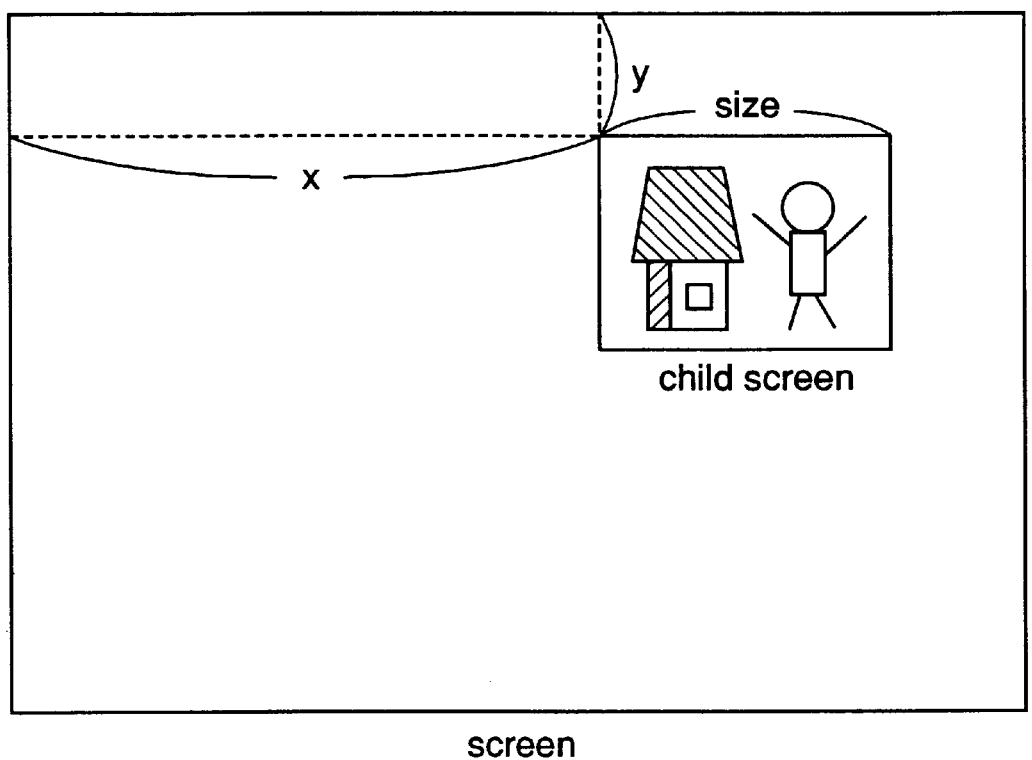
FIG. 2 is a diagram illustrating key frame information for explaining the operation of the image editing apparatus.

According to the curve interpolation mentioned above, the curve interpolation unit 107 outputs image control data for substantially controlling the image, such as coordinate data, or size data and zoom ratio, as shown in FIG. 2 by interpolating between key frames.

Although in the foregoing description emphasis has been placed upon a curve interpolation method using Bézier curves, the present invention is not restricted thereto. Other curve interpolation methods, for example, a method using general spline curves, may be employed with the same effects as mentioned above.

Further, in the foregoing description, when a second interpolation control point is obtained, this point is made in a straight line passing the key frame and parallel to the t axis, that is, the inclination of a tangent line of the interpolation curve is parallel to the t axis. For 'end point', however, the manner of making a second interpolation control point is not restricted to that mentioned above.

Furthermore, in the foregoing description, a satisfactory result is obtained when u=1 and v=2. However, to increase the operation speed, other values, for example, u=1 and v=3, may be employed.

Figure 7:
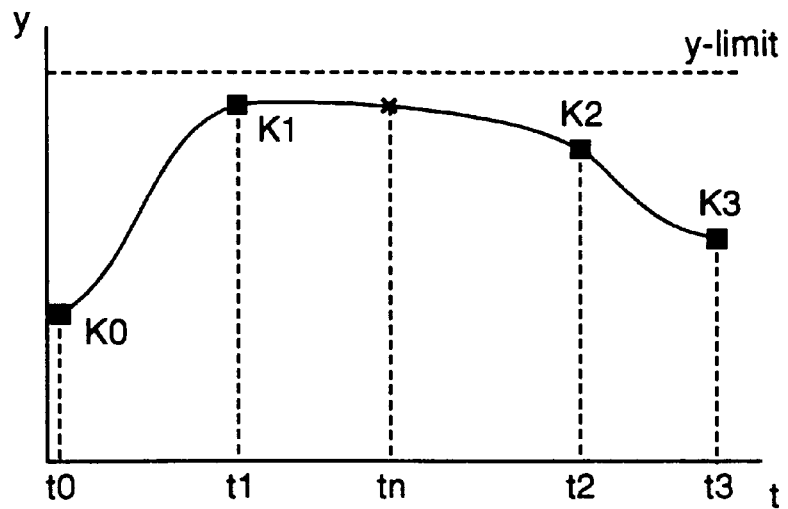
FIGS. 7(a) and 7(b) are diagrams for explaining an effect provided by interpolation control using the image editing apparatus.
Figure 7:
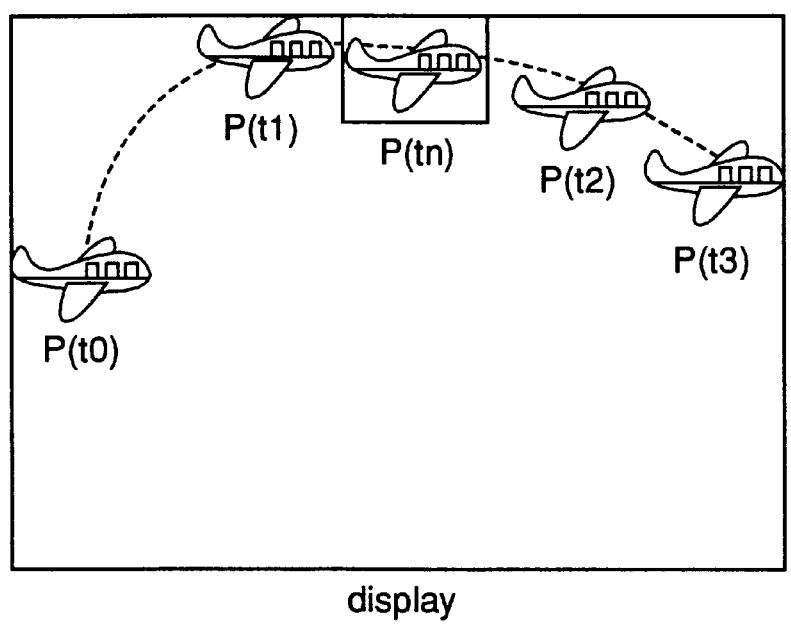
Figure 8:
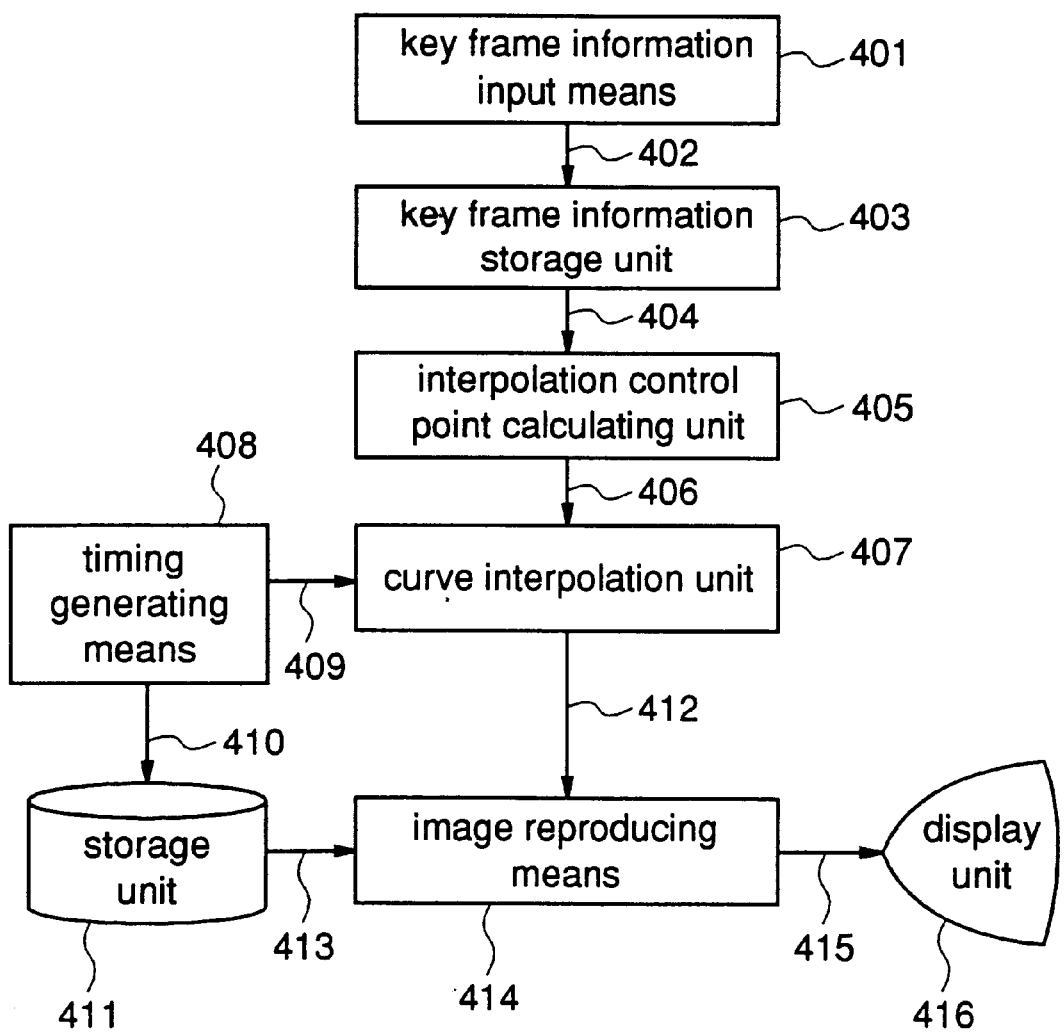
FIG. 8 is a block diagram illustrating an image editing apparatus according to the prior art.
Figure 9:
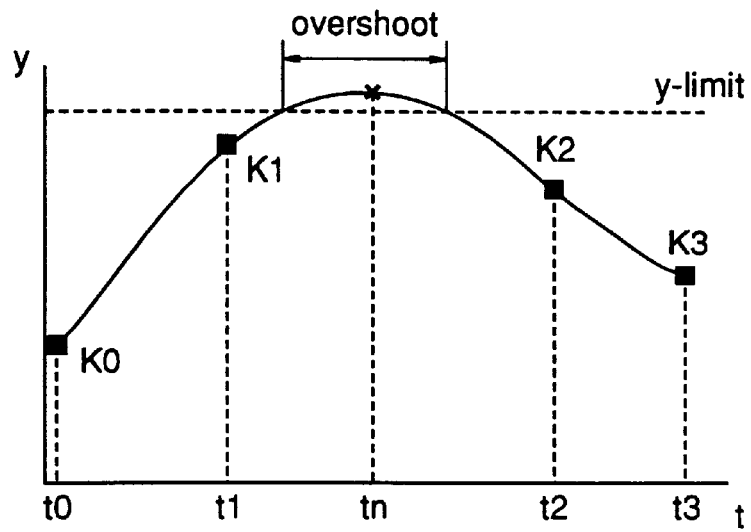
FIGS. 9(a) and 9(b) are diagrams for explaining a problem of the image editing apparatus according to the prior art.
Figure 9:
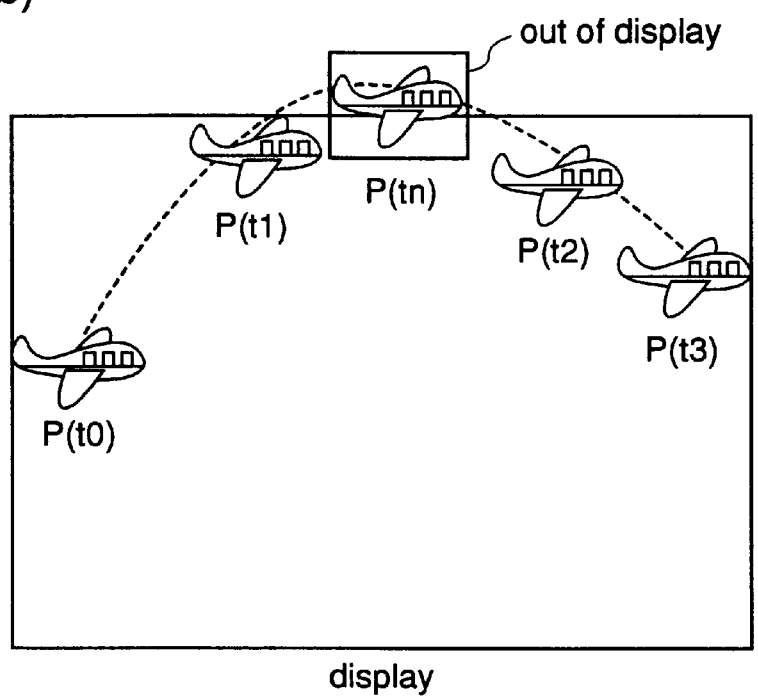

In the above-mentioned embodiment of the invention, the image editing apparatus is provided with the key frame shape decision unit 109 and the second interpolation control point calculating unit 111. When the key frame shape decision unit 109 decides that the shape of the key frame is 'end point' or 'mountain/valley point', the second interpolation control point calculating unit 111 calculates second interpolation control points, and the curve interpolation unit 107 performs curve interpolation between key frames using the second interpolation control points in place of the first interpolation control points, whereby precise interpolation is performed as shown in FIGS. 7(a) and 7(b). That is, when four key frames, K0, K1, K2, K3 are input as shown in FIG. 7(a), the image in the image display position P(tn) at time tn is disposed within the display as shown in FIG. 7(b). Therefore, even in a key frame at which the motion of image suddenly changes (end point or mountain/valley point), image control data with an effect that fits the visual characteristics of human beings is easily produced, resulting in satisfactory image control.

As described above, according to the present invention, an image effect that accelerates the motion of image at the starting point key frame and brakes the motion in the vicinity of the end point key frame is easily obtained without adding key frames manually. Further, an image effect of controlling the range of the motion of image with the key frame at 'mountain/valley point' is obtained. These image effects result in a beautiful image that fits the visual characteristics of human beings.

What is claimed is:

1. An image editing apparatus comprising:

key frame information input means for inputting key frame information comprising time on an image sequence and other information;

key frame information storage means for storing the key frame information;

first interpolation control point calculating means for receiving the key frame information output from the key frame information storage means, and calculating first interpolation control points used for curve interpolation, by a first calculation method;

key frame shape decision means for receiving the key frame information output from the key frame information storage means, deciding the shape of a key frame, and outputting key frame shape information;

second interpolation control point calculating means for receiving the key frame information output from the key frame information storage means and the key frame shape information output from the key frame shape decision means, and calculating second interpolation control points by a second calculation method different from the first calculation method when the key frame shape is an 'end point' or 'mountain/valley point';

timing generating means for generating timing information of image output;

curve interpolation means for receiving the first interpolation control points output from the first interpolation control point calculating means, second interpolation control points output from the second interpolation control point calculating means, and the timing information output from the timing generating means, and for replacing first interpolation control points obtained in the first interpolation control point calculating means with second interpolation control points obtained in the second interpolation control point calculating means as well, and for performing curve interpolation between key frames with curves using the second replacement interpolation control points, for performing curve interpolation between key frames, and for outputting image control information;

storage means for receiving the timing information output from the timing generating means, and outputting an image at the input time; and image reproducing means for receiving the image output from the storage means and the image control information output from the curve interpolation means, and outputting the image to a display unit.

2. The image editing apparatus of claim 1 wherein the second interpolation control point calculating means calculates second interpolation control points for curve interpolation between two key frames which are represented on a coordinate plane having the time on its abscissa and one of other key frame information on its ordinate, and tangent lines passing the respective key frames have prescribed gradients.

3. An image editing method in which key frame information comprising time on an image sequence and other information is input, and an image is output after performing curve interpolation between key frames using image control information, said method comprising the steps of:

deciding the shape of a key frame from the input key frame information and, when the shape is an 'end point' or 'mountain/valley point,' calculating interpolation control points by a calculation method different from an ordinary calculation method; and producing the image control information by performing curve interpolation between key frames using interpolation control points calculated by the ordinary calculating method, the interpolation control points calculated by the calculating method different from the ordinary method, and image output timing information, and replacing interpolation control points obtained in the ordinary interpolation control point calculating method, with replacement interpolation control points obtained in the calculating method different from the ordinary method, and performing curve interpolation between the key frames is with curves using the replacement interpolation control points calculated by the calculating method different from the ordinary method.

4. The image editing method of claim 3 wherein, when the shape of the key frame is 'end point' or 'mountain/valley point', in order to perform curve interpolation between two key frames which are represented on a coordinate plane having the time on its abscissa and one of other key frame information on its ordinate, the interpolation control points are calculated using tangent lines passing the respective key frames and having prescribed gradients.

* * * * *